United States Patent
Mori et al.

(10) Patent No.: US 11,321,310 B2
(45) Date of Patent: May 3, 2022

(54) SYSTEM, METHOD, AND APPARATUS FOR GENERATING ANALYTICS WITH STRUCTURED QUERY FILES

(71) Applicant: Visa International Service Association, San Francisco, CA (US)

(72) Inventors: Kevin Isao Mori, San Francisco, CA (US); Lace Cheung, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 139 days.

(21) Appl. No.: 16/408,564

(22) Filed: May 10, 2019

(65) Prior Publication Data

US 2019/0347254 A1 Nov. 14, 2019

Related U.S. Application Data

(60) Provisional application No. 62/670,021, filed on May 11, 2018.

(51) Int. Cl.
| | |
|---|---|
| G06F 16/00 | (2019.01) |
| G06F 16/242 | (2019.01) |
| G06F 16/2453 | (2019.01) |
| H04L 67/06 | (2022.01) |
| G06F 16/16 | (2019.01) |
| G06F 16/25 | (2019.01) |

(52) U.S. Cl.
CPC ........ *G06F 16/2423* (2019.01); *G06F 16/168* (2019.01); *G06F 16/24535* (2019.01); *G06F 16/252* (2019.01); *H04L 67/06* (2013.01)

(58) Field of Classification Search
CPC ........... G06F 16/2423; G06F 16/24535; G06F 16/168; G06F 16/252; G06F 16/245; H04L 67/06
See application file for complete search history.

(56) References Cited

U.S. PATENT DOCUMENTS

| | | | |
|---|---|---|---|
| 5,625,816 A * | 4/1997 | Burdick | G06Q 10/087 |
| 2004/0172382 A1 * | 9/2004 | Prang | G06F 16/2452 |
| 2017/0109413 A1 * | 4/2017 | Gholami | G06Q 30/02 |
| 2018/0314745 A1 * | 11/2018 | Filippi | G06F 16/2455 |
| 2019/0340285 A1 * | 11/2019 | Said | G06F 16/2465 |

* cited by examiner

*Primary Examiner* — Augustine K. Obisesan
(74) *Attorney, Agent, or Firm* — The Webb Law Firm

(57) ABSTRACT

Provided is a system, method, and apparatus for generating analytics with structured query files. The method includes the steps of generating at least one graphical user interface configured to receive query parameters from a user for querying transaction data, generating a request file based on the query parameters, the request file including a request definition object and a segment object, processing the request file to query at least one transactional database based at least partially on the request file, and generating a response file including transaction data based on a return from the query of the at least one database, the response file structured based on the request definition object from the request file.

16 Claims, 3 Drawing Sheets

SYSTEM, METHOD, AND APPARATUS FOR GENERATING ANALYTICS WITH STRUCTURED QUERY FILES

CROSS REFERENCE TO RELATED APPLICATION

This application claims the benefit of U.S. Provisional Application No. 62/670,021, filed on May 11, 2018, the entire content of which is hereby incorporated by reference.

BACKGROUND OF THE INVENTION

1. Field of the Invention

This disclosure relates generally to queries and, in one particular embodiment, to a system, method, and apparatus for generating analytics with structured query files.

2. Technical Considerations

Existing systems and methods for querying transaction data require specific inputs and result in specific outputs. Merchants, issuing banks, acquiring banks, and other participants in an electronic payment processing network often rely on inflexible tools for obtaining specific types of transaction data. Even then, the transaction data still needs to be processed manually by users to generate analytical insights.

SUMMARY OF THE INVENTION

According to non-limiting embodiments or aspects, provided is a computer-implemented method for generating a query for transaction data, comprising: generating at least one graphical user interface configured to receive query parameters from a user for querying transaction data; generating a request file based on the query parameters, the request file comprising a request definition object and a segment object; processing the request file to query at least one transactional database based at least partially on the request file; and generating a response file comprising transaction data based on a return from the query of the at least one database, the response file structured based on the request definition object from the request file.

According to other non-limiting embodiments or aspects, provided is a computer-implemented method for generating analytics with structured query files, comprising: generating a request file based on query parameters, the request file comprising a request definition object; processing the request file to query at least one transactional database based at least partially on the request file; and generating a response file comprising transaction data based on a return from the query of the at least one database, the response file structured based on the request definition object from the request file.

According to other non-limiting embodiments or aspects, provided is a system for generating analytics with structured query files, comprising at least one server computer including at least one processor programmed or configured to: generate at least one graphical user interface configured to receive query parameters from a user for querying transaction data; generate a request file based on the query parameters, the request file comprising a request definition object and a segment object; process the request file to query at least one transactional database based at least partially on the request file; and generate a response file comprising transaction data based on a return from the query of the at least one database, the response file structured based on the request definition object from the request file.

According to non-limiting embodiments or aspects, provided is a computer-implemented method for generating analytics with structured query files, comprising: generating, with at least one processor, at least one graphical user interface configured to receive query parameters from a user for querying transaction data; receiving, with at least one processor, a request file comprising a request definition object and a segment object, the request file generated based on the query parameters; querying, with at least one processor, the at least one transaction database based on the request file; receiving, with at least one processor, a return from the query of the at least one database; and generating, with at least one processor, a response file comprising transaction data based on the return from the query, the response file structured based on the request definition object from the request file.

In non-limiting embodiments or aspects, the request file comprises a plurality of separate queries, and the response file comprises results from each of the separate queries. In non-limiting embodiments or aspects, the request file is structured in Javascript Object Notation (JSON) format. In non-limiting embodiments or aspects, the request file comprises a request type parameter identifying at least one application. In non-limiting embodiments or aspects, the request definition object comprises at least one of the following metadata fields: requestor identifier, project identifier, client identifier, or any combination thereof. In non-limiting embodiments or aspects, the request file comprises at least one query, and wherein each query of the at least one query comprises at least one of the following: a query identifier, a date filter, a dimension filter, a metric filter, an output dimension, an output metric, or any combination thereof.

In non-limiting embodiments or aspects, the at least one query identifies the segment object. In non-limiting embodiments or aspects, the segment object identifies at least one external segment file, the query is based on the request file and at least one external segment file. In non-limiting embodiments or aspects, the method further comprises transmitting, with at least one processor, at least one segment file separately from the request file, the segment object identifies the at least one segment file.

According to non-limiting embodiments or aspects, provided is a system for generating analytics with structured query files, comprising at least one processor programmed or configured to: generate at least one graphical user interface configured to receive query parameters from a user for querying transaction data; receive a request file comprising a request definition object and a segment object, the request file generated based on the query parameters; querying the at least one transaction database based on the request file; receive a return from the query of the at least one database; and generate a response file comprising transaction data based on the return from the query, the response file structured based on the request definition object from the request file.

In non-limiting embodiments or aspects, the request file comprises a plurality of separate queries, and the response file comprises results from each of the separate queries. In non-limiting embodiments or aspects, the request file is structured in Javascript Object Notation (JSON) format. In non-limiting embodiments or aspects, the request file comprises a request type parameter identifying at least one application. In non-limiting embodiments or aspects, the request definition object comprises at least one of the following metadata fields: requestor identifier, project identifier, client identifier, or any combination thereof. In non-limiting embodiments or aspects, the request file comprises at least one query, and wherein each query of the at least one query comprises at least one of the following: a query identifier, a date filter, a dimension filter, a metric filter, an output dimension, an output metric, or any combination thereof.

In non-limiting embodiments or aspects, the at least one query identifies the segment object. In non-limiting embodiments or aspects, the segment object identifies at least one external segment file, the query is based on the request file and at least one external segment file. In non-limiting embodiments or aspects, the segment object identifies a plurality of segment files. In non-limiting embodiments or aspects, the at least one processor is further programmed or configured to transmit at least one segment file separately from the request file, the segment object identifies the at least one segment file.

According to non-limiting embodiments or aspects, provided is a computer program product for generating analytics with structured query files, comprising at least one non-transitory computer-readable medium including program instructions that, when executed by at least one processor, cause the at least one processor to: generate at least one graphical user interface configured to receive query parameters from a user for querying transaction data; receive a request file comprising a request definition object and a segment object, the request file generated based on the query parameters; querying the at least one transaction database based on the request file; receive a return from the query of the at least one database; and generate a response file comprising transaction data based on the return from the query, the response file structured based on the request definition object from the request file.

Further embodiments or aspects are set forth in the following numbered clauses:

Clause 1: A computer-implemented method for generating analytics with structured query files, comprising: generating, with at least one processor, at least one graphical user interface configured to receive query parameters from a user for querying transaction data; receiving, with at least one processor, a request file comprising a request definition object and a segment object, the request file generated based on the query parameters; querying, with at least one processor, the at least one transaction database based on the request file; receiving, with at least one processor, a return from the query of the at least one database; and generating, with at least one processor, a response file comprising transaction data based on the return from the query, the response file structured based on the request definition object from the request file.

Clause 2: The computer-implemented method of clause 1, wherein the request file comprises a plurality of separate queries, and wherein the response file comprises results from each of the separate queries.

Clause 3: The computer-implemented method of clauses 1 or 2, wherein the request file is structured in Javascript Object Notation (JSON) format.

Clause 4: The computer-implemented method of any of clauses 1-3, wherein the request file comprises a request type parameter identifying at least one application.

Clause 5: The computer-implemented method of any of clauses 1-4, wherein the request definition object comprises at least one of the following metadata fields: requestor identifier, project identifier, client identifier, or any combination thereof.

Clause 6: The computer-implemented method of any of clauses 1-5, wherein the request file comprises at least one query, and wherein each query of the at least one query comprises at least one of the following: a query identifier, a date filter, a dimension filter, a metric filter, an output dimension, an output metric, or any combination thereof.

Clause 7: The computer-implemented method of any of clauses 6-6, wherein the at least one query identifies the segment object.

Clause 8: The computer-implemented method of any of clauses 1-7, wherein the segment object identifies at least one external segment file, wherein the query is based on the request file and at least one external segment file.

Clause 9: The computer-implemented method of any of clauses 1-8, further comprising transmitting, with at least one processor, at least one segment file separately from the request file, wherein the segment object identifies the at least one segment file.

Clause 10: A system for generating analytics with structured query files, comprising at least one processor programmed or configured to: generate at least one graphical user interface configured to receive query parameters from a user for querying transaction data; receive a request file comprising a request definition object and a segment object, the request file generated based on the query parameters; querying the at least one transaction database based on the request file; receive a return from the query of the at least one database; and generate a response file comprising transaction data based on the return from the query, the response file structured based on the request definition object from the request file.

Clause 11: The system of clause 10, wherein the request file comprises a plurality of separate queries, and wherein the response file comprises results from each of the separate queries.

Clause 12: The system of clauses 10 or 11, wherein the request file is structured in Javascript Object Notation (JSON) format.

Clause 13: The system of any of clauses 10-12, wherein the request file comprises a request type parameter identifying at least one application.

Clause 14: The system of any of clauses 10-13, wherein the request definition object comprises at least one of the following metadata fields: requestor identifier, project identifier, client identifier, or any combination thereof.

Clause 15: The system of any of clauses 10-14, wherein the request file comprises at least one query, and wherein each query of the at least one query comprises at least one of the following: a query identifier, a date filter, a dimension filter, a metric filter, an output dimension, an output metric, or any combination thereof.

Clause 16: The system of any of clauses 10-15, wherein the at least one query identifies the segment object.

Clause 17: The system of any of clauses 10-16, wherein the segment object identifies at least one external segment file, wherein the query is based on the request file and at least one external segment file.

Clause 18: The system of any of clauses 10-17, wherein the segment object identifies a plurality of segment files.

Clause 19: The system of any of clauses 10-18, wherein the at least one processor is further programmed or configured to transmit at least one segment file separately from the request file, wherein the segment object identifies the at least one segment file.

Clause 20: A computer program product for generating analytics with structured query files, comprising at least one non-transitory computer-readable medium including program instructions that, when executed by at least one processor, cause the at least one processor to: generate at least one graphical user interface configured to receive query parameters from a user for querying transaction data; receive a request file comprising a request definition object and a segment object, the request file generated based on the query parameters; query the at least one transaction database based on the request file; receive a return from the query of the at least one database; and generate a response file comprising transaction data based on the return from the query, the response file structured based on the request definition object from the request file.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
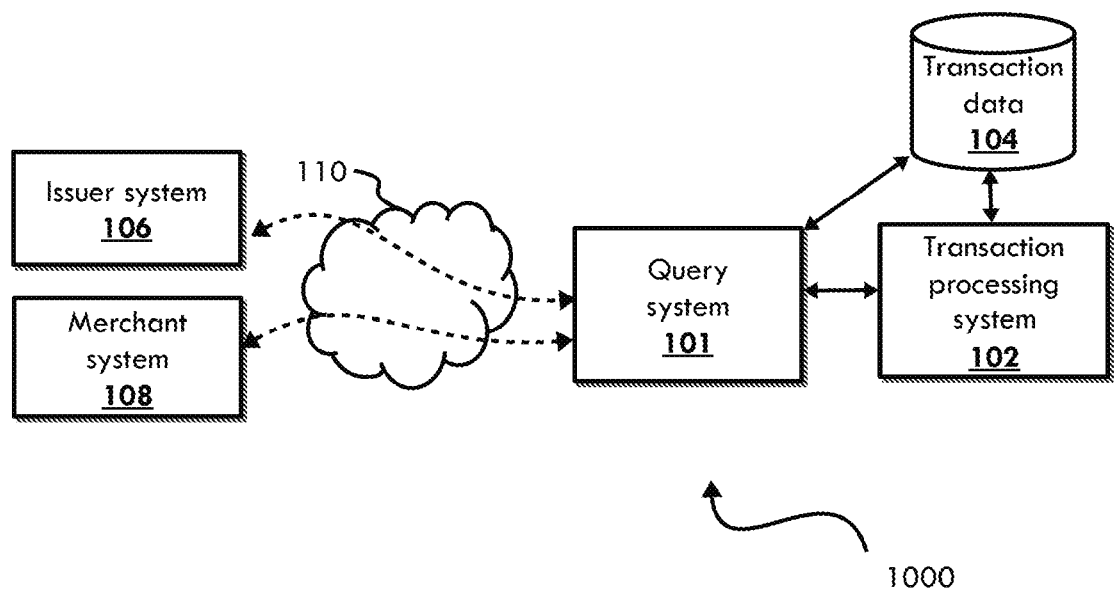
FIG. 1 is a schematic diagram of a system for generating analytics with structured query files according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computing devices and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider. As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider.

As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

Non-limiting embodiments of the present disclosure are directed to a system, method, and computer program product for generating analytics with structured query files. Non-limiting embodiments utilize a unique file structure, including a request file and one or more segment files, to allow a user to request a particular set of transaction data from a database. This new file structure and system architecture allows for queries to be processed in an efficient manner, saving computing resources such as processing cycles, memory, network bandwidth, and the like. The file structure and system architecture also allows for multiple queries to be submitted by a user in a structured manner for processing. Users are provided with greater flexibility in the manner in which transaction data is requested, the types of transaction data available, and defining the structure and/or format of the output. By affecting the structure of a response file, non-limiting embodiments allow for efficiencies with user-side applications that do not have to process or parse the data in the usual way to visualize analytical insights or to structure it in a usable format, thereby saving additional computing resources. Increased flexibility for users requesting data also allows for the transaction data to be processed by a transaction service provider to identify analytical insights, rather than by users having less or insufficient computing resources to process raw data for specific analytics.

Referring now to FIG. 1, a system 1000 for generating analytics with structured query files is shown according to a non-limiting embodiment. User systems, such as issuer system 106 and merchant system 108, communicate with a query system 101 via one or more network environments 110. It will be appreciated that various other user systems may utilize the system 1000 for querying transaction data. Query system 101 may include one or more servers providing interfaces for the user systems 106, 108 to interact with. The query system 101 may be in communication with a transaction processing system 102 or, in some non-limiting examples, may be part of the transaction processing system 102. For example, the query system 101 may include one or more software applications executed by the transaction processing system 102.

With continued reference to FIG. 1, a transaction database 104 is in communication with the transaction processing system 102 for recording transaction data for each transaction processed by the transaction processing system 102. Transactions may be initiated at physical POS systems or through the Internet by a customer presenting a portable payment device to a merchant or payment gateway. Transaction data relating to such a transaction may identify the customer, the account identifier, the transaction value, the portable payment device used, the payment channel used (e.g., online, in-person, etc.), the location of the transaction, the merchant category, the specific merchant, a time and date, and/or other like information relating to the transaction. The transaction database 104 may store transaction data for the user across one or more payment devices and/or account identifiers. For example, in scenarios in which a user has multiple payment devices issued by multiple issuer institutions, the transaction database 104 may include transaction data for all transactions initiated with any of those payment devices.

Still referring to FIG. 1, in non-limiting embodiments, the issuer system 106, merchant system 108, and/or any other user system generates request files and/or segment files to be communicated to the query system 101 and/or transaction processing system 102. The request files and/or segment files may be generated by a client-side application executing on the user system (e.g., issuer system 106 and/or merchant system 108 in the example shown in FIG. 1) or by a software-as-a-service application accessed over a network environment 110. The transaction processing system 102 may generate analytics based on the transaction data and specific queries processed from the query system 101 or received directly from the network environment 110. The query system 101 may also be in communication with the transaction database 104 to obtain the transaction data directly rather than communicating through the transaction processing system 102. It will be appreciated that various other arrangements are possible.

Figure 2:
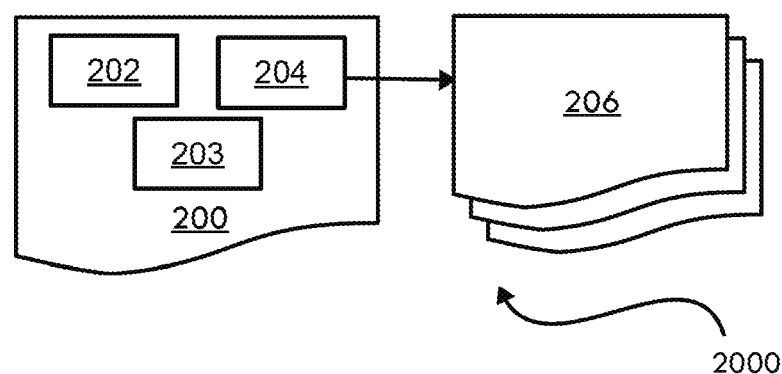
FIG. 2 is a schematic diagram of a request file and segment files according to a non-limiting embodiment.

Referring now to FIG. 2, a request 2000 is shown according to a non-limiting embodiment. The request 2000 includes a request file 200 and a plurality of segment files 206. It will be appreciated, however, that non-limiting embodiments may utilize only a request file 200 and a single segment file or may not utilize any segment files at all. The request file 200 includes a request definition object 202, a query object 203, and a segment object 204. The objects 202, 203, 204 may include one or more data structures including one or more parameters. The request definition object 202 may include one or more data structures including a plurality of metadata fields to store metadata parameters relating to the request 2000. For example, the request definition object 202 may include a requestor identifier field (identifying an individual or entity making the request), a project identifier field, a project name field, a client identifier field, and a query field. The query field may be an array that identifies one or more query objects 203. It will be appreciated that the request definition object 202 may be structured in various other ways.

With continued reference to FIG. 2, each query object 203 may include one or more data structures that represent a separate query requested by the user. In some non-limiting embodiments, a query object 203 may include several fields to specify the transaction data desired by the user. For example, the query object 203 may include, as elements, a query identifier, a date filter, a dimension filter, a metric filter, output dimensions, output metrics, and segments. The output dimensions and/or output metrics may be an array that defines the structure and/or format of the response file that will be generated based on the query. In some non-limiting embodiments, the output dimensions and/or output metrics may depend upon an application or system making the request and, in other non-limiting embodiments, an end-user may customize these parameters.

Still referring to FIG. 2, the segment object 204 may include one or more data structures, pointers, addresses, and/or the like that point to (e.g., identify a location of) the segment files 206. In this manner, multiple different request files 200 and different requests 2000 can point to the same segment files 206. This allows for segment files 206 to be used for multiple queries without having to reconfigure or generate those files more than once. In some non-limiting embodiments, the segment files 206 may be communicated once, stored by the transaction processing system, and reused for later queries. It will be appreciated that various other arrangements are possible.

In non-limiting embodiments, date filters define a time period for the requested transaction data. The date filter may be an object that includes multiple parameter elements such as, for example, a date identifier, a start date, and an end date. The dates may be based on a purchase date of corresponding transactions. In JSON, a date filter may be represented as: "dateFilters": [{"id": "campaign1", "startDate": "20170320", "endDate": "20170414"}]. It will be appreciated that date filters may be represented with any type of structured data.

In non-limiting embodiments, dimension filters define a scope of the transaction data based on transaction dimensions provided by a transaction service provider. For example, the dimension filter may be an object that includes multiple parameter elements such as a dimension (e.g., merchant ID, channel, Merchant Category Code (MCC), etc.), a value to include in the search, a value to not include in the search, and/or the like. In JSON, a dimension filter may be represented as: "dimensionFilters": [{"dimension": "VMID", "in": ["123456"]}], to filter by merchants having an ID ("VMID") of "123456", or as: "dimensionFilters": [{"dimension": "channel", "in": ["CP"]}], as an example to filter by channel for card-present ("CP") transactions. It will be appreciated that dimension filters may be represented with any type of structured data.

In non-limiting embodiments, metric filters define a scope of the transaction data based on transaction metrics provided by a transaction service provider. For example, the metrics filter may be an object that includes, as elements, a metric (e.g., transaction amount, number of purchases, deviation from other transactions, etc.) and various comparators (e.g., equal to, not equal to, less than, less than or equal to, etc.). In JSON, a metric filter may be represented as: "metricFilters": [{"metric": "transactionAmount", "gt": 25}], as an example to filter by transaction values greater than $25. It will be appreciated that metric filters may be represented with any type of structured data.

The query object may also include one or more segment objects. A segment object may represent a requestor-defined population (e.g., segment) that the requestor wants analytics for. A segment is defined with a list of external user identifiers and is communicated in a supplemental segment file separate from the request file. The transaction service provider that provides the transaction data may require an identifier match with the requestor for processing segment objects. For example, the transaction service provider may compare the external user identifier with a user identifier of record. A segment object may include one or more parameter elements such as, for example, a segment type, a list of segment files (including filename, record counts, checksum, etc.), and a file schema (e.g., a list or structure of field names in the segment file). In JSON, a segment object may be represented as: "segments": [{"segmentType": "external", "segmentFileSchema": "segmentId,externalUserId", "segmentFiles": [{"fileName": "segment_VASPARTNER_exposed_20180201T104553.txt.gz", "count": 10000}]}], as an example. It will be appreciated that a segment object may be represented with any type of structured data.

In non-limiting embodiments, one or more segment files may be used to supplement a request file when a requestor wants to request a population for analytics. For example, a request may be associated with one or more segment files that are external to (e.g., separate from) the request file and that are communicated along with the request file. In some non-limiting examples, the segment files may be hosted at a network location and a pointer may be provided to the hosted segment files rather than providing the segment files themselves.

In non-limiting embodiments, one or more response files may be generated in response to one or more queries processed according to a request file. The response file may be structured based on the output dimensions and/or output metrics specified in the request file.

In non-limiting embodiments, each query may include or exclude fields based on the information and/or analytics requested by a user. This allows for greater efficiencies in both network bandwidth and processing resources by reducing the amount of information transmitted.

For example, in non-limiting embodiments, a merchant system 108 may request analytics on transaction data for all card-present transactions at a particular store location from a start date to an end date, where the transaction value is between $10 and $50. The merchant system 108 may also request a particular format for the response data, including a format that may be readable by a particular application used by the merchant system 108. As an example, the merchant system 108 may request the data in a format that is readable by a spreadsheet application, a graphics engine, an artificial intelligence engine, and/or the like. In non-limiting embodiments, the response data may be visualized through charts, graphs, and/or the like.

Figure 3:
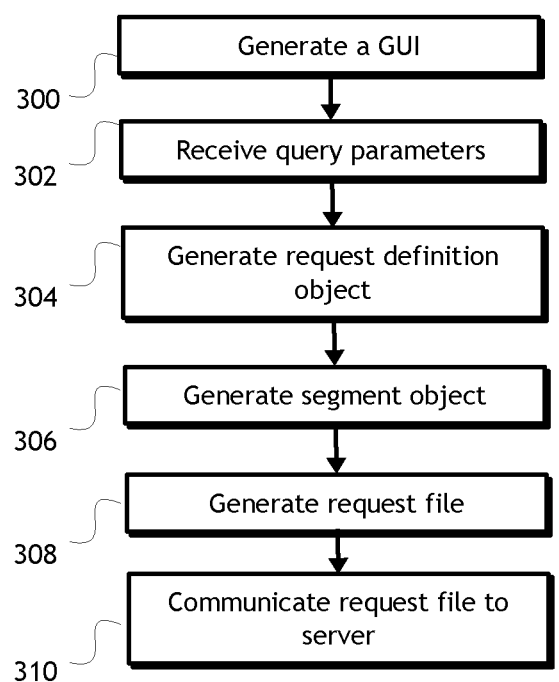
FIG. 3 is a flow diagram of a method for generating analytics with structured query files according to a non-limiting embodiment.

Referring now to FIG. 3, a flow diagram of a method for generating analytics with structured query files is shown according to a non-limiting embodiment. At a first step, a GUI is generated 300 on a display device of a user system (e.g., a computing device operated by an end-user). The GUI may be generated by the user system and/or by a server in communication with the user system. At step 302, query parameters are inputted into the GUI and received by one or more software applications executing on the user system. As an example, the query parameters may be typed, selected from a menu, input from another application, and/or the like. At step 304, a request definition object is generated by the user system. As described here, the request definition object may include metadata parameter fields, including a requestor identifier field (identifying an individual or entity making the request), a project identifier field, a project name field, a client identifier field, and a query field, as examples. The query field may include a structured query constructed from the query parameters received at step 302. In some non-limiting embodiments, the user may construct the query themselves and input a constructed query into the GUI at step 302.

With continued reference to FIG. 3, at step 306 a segment object is generated by the user system. As described herein, the segment object may point to or include one or more segment files. At step 308, a request file is generated based on the request definition object and the segment object. In some non-limiting embodiments, the request file may also be generated based on a query object. As described herein, the query object may include one or more segment objects generated at step 306. At step 310, the request file is communicated to a remote server, such as a query system and/or transaction processing system.

Figure 4:
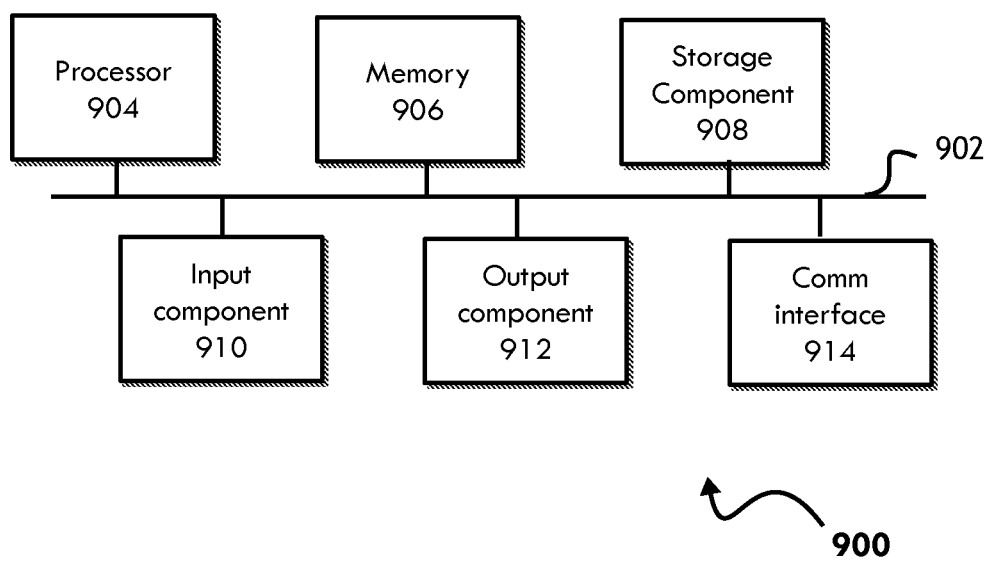
FIG. 4 illustrates components of one or more devices or systems used in non-limiting embodiments.

Referring now to FIG. 4, shown is a diagram of example components of a device 900 according to non-limiting embodiments. Device 900 may correspond to the issuer system 106, merchant system 108, query system 101, and/or transaction processing system 102 in FIG. 1, as an example. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 1. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for generating analytics with structured query files, comprising:
   generating, with at least one processor, at least one graphical user interface configured to receive query parameters from a user for querying transaction data;
   generating, with at least one processor, a request file based on the query parameters, the request file comprising a request definition object and a segment object;
   transmitting, with at least one processor, the request file;
   transmitting, with at least one processor, at least one external segment file separately from the request file, wherein the segment object identifies the at least one external segment file;
   receiving, with at least one processor, the request file and the at least one external segment file;
   querying, with at least one processor, at least one transaction database based on the request definition object and the at least one external segment file, the at least one external segment file representing a population associated with a subset of the transaction data in the at least one transaction database;
   receiving, with at least one processor, a return from the query of the at least one transaction database; and
   generating, with at least one processor, a response file comprising transaction data based on the return from the query, the response file structured based on the request definition object from the request file.

2. The computer-implemented method of claim 1, wherein the request file comprises a plurality of separate queries, and wherein the response file comprises results from each of the separate queries.

3. The computer-implemented method of claim 1, wherein the request file is structured in Javascript Object Notation (JSON) format.

4. The computer-implemented method of claim 1, wherein the request file comprises a request type parameter identifying at least one application.

5. The computer-implemented method of claim 1, wherein the request definition object comprises at least one of the following metadata fields: requestor identifier, project identifier, client identifier, or any combination thereof.

6. The computer-implemented method of claim 1, wherein the request file comprises at least one query, and wherein each query of the at least one query comprises at least one of the following: a query identifier, a date filter, a dimension filter, a metric filter, an output dimension, an output metric, or any combination thereof.

7. The computer-implemented method of claim 6, wherein the at least one query identifies the segment object.

8. A system for generating analytics with structured query files, comprising at least one processor programmed or configured to:
   generate at least one graphical user interface configured to receive query parameters from a user for querying transaction data;
   generate a request file based on the query parameters, the request file comprising a request definition object and a segment object;
   transmit the request file;

transmit at least one external segment file separately from the request file, wherein the segment object identifies the at least one external segment file;
receive the request file and the at least one external segment file;
query at least one transaction database based on the request file and the at least one external segment file, the at least one external segment file representing a population associated with a subset of the transaction data in the at least one transaction database;
receive a return from the query of the at least one transaction database; and
generate a response file comprising transaction data based on the return from the query, the response file structured based on the request definition object from the request file.

9. The system of claim 8, wherein the request file comprises a plurality of separate queries, and wherein the response file comprises results from each of the separate queries.

10. The system of claim 8, wherein the request file is structured in Javascript Object Notation (JSON) format.

11. The system of claim 8, wherein the request file comprises a request type parameter identifying at least one application.

12. The system of claim 8, wherein the request definition object comprises at least one of the following metadata fields: requestor identifier, project identifier, client identifier, or any combination thereof.

13. The system of claim 8, wherein the request file comprises at least one query, and wherein each query of the at least one query comprises at least one of the following: a query identifier, a date filter, a dimension filter, a metric filter, an output dimension, an output metric, or any combination thereof.

14. The system of claim 13, wherein the at least one query identifies the segment object.

15. The system of claim 8, wherein the segment object identifies a plurality of segment files.

16. A computer program product for generating analytics with structured query files, comprising at least one non-transitory computer-readable medium including program instructions that, when executed by at least one processor, cause the at least one processor to:
generate at least one graphical user interface configured to receive query parameters from a user for querying transaction data;
generate a request file based on the query parameters, the request file comprising a request definition object and a segment object;
transmit the request file;
transmit at least one external segment file separately from the request file, wherein the segment object identifies the at least one external segment file;
receive the request file and the at least one external segment file;
query at least one transaction database based on the request file and the at least one external segment file, the at least one external segment file representing a population associated with a subset of the transaction data in the at least one transaction database;
receive a return from the query of the at least one transaction database; and
generate a response file comprising transaction data based on the return from the query, the response file structured based on the request definition object from the request file.

* * * * *